Dec. 16, 1952    J. D. STRONG    2,621,451
APPARATUS FOR MAKING AND MOUNTING PERFECT SCREWS
Filed April 18, 1947
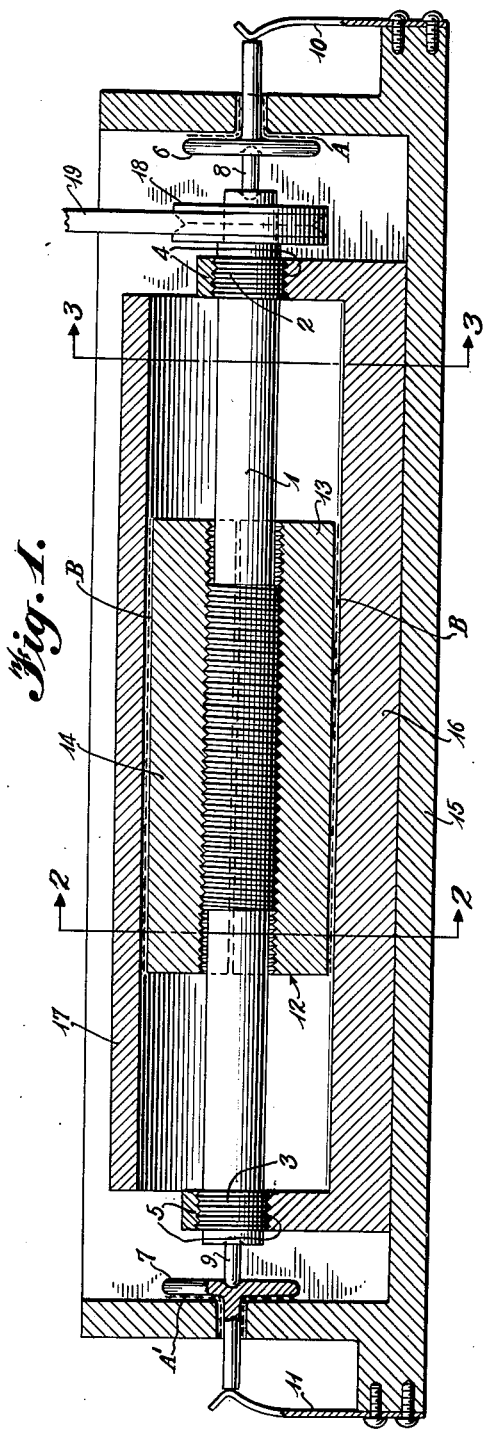
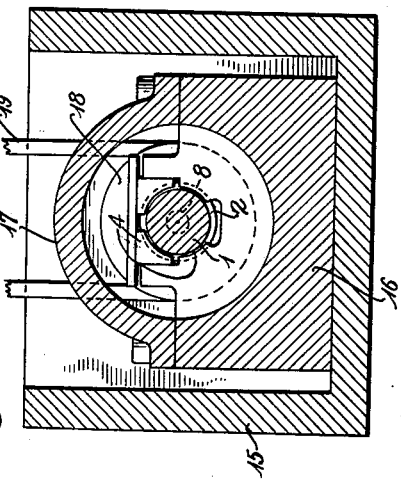
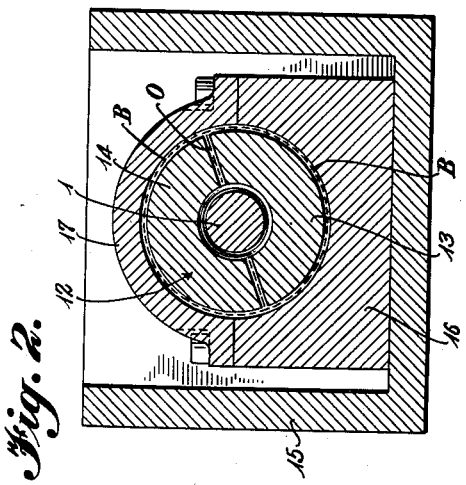
INVENTOR
John D. Strong
BY *Jewett, Mead & Browne*
ATTORNEYS Patented Dec. 16, 1952

2,621,451

UNITED STATES PATENT OFFICE 2,621,451

APPARATUS FOR MAKING AND MOUNTING PERFECT SCREWS

John Donovan Strong, Baltimore, Md.

Application April 18, 1947, Serial No. 742,417

6 Claims. (Cl. 51—156)

This invention relates to apparatus for finishing work. More particularly the invention pertains to apparatus for lapping elongated work such as cylindrical or rotationally symmetrical or screw-shaped bodies, i. e. bodies having surfaces conforming to surfaces generated by the rotation of plane curves about an axis, with or without simultaneous translation of such curves along said axis.

In some of its more specific aspects the present invention relates to apparatus for lapping substantially cylindrical work having irregularities, to produce an article having, among other things, absolutely uniform concentricity between the surface of the work and the mounting by which such finished work may be carried. The invention finds particular utility in the manufacture and mounting of a "perfect" screw such as the type required for use in a ruling engine for making diffraction gratings.

Henry Rowland, in his article "The Screw," in Ed. XI, of Encyclopedia Britannica, says that "the mounting of the screw is more difficult than its construction." One aspect of the present invention is an improvement over Rowland's method of making and mounting a "perfect" screw such as the type used in a ruling engine. The apparatus by which the present invention produces a "perfect" screw makes it possible to finish the screw in such a manner that it may be perfectly mounted in a ruling engine frame. Broadly, however, the teachings of the present invention can be applied to the finishing of any rotationally symmetrical or screw-shaped piece of work, particularly one having a surface which must be axially coordinated with a mounting, usually being coordinated concentrically and coaxially with such mounting. The apparatus of the present invention, of course, can be applied to the finishing of any machine screw and will produce an extremely accurate screw with accurately coordinated mounting surfaces.

It is an object of the present invention to provide, among other things, apparatus for manufacturing a rotationally symmetrical or screw-shaped body adapted to be carried by a suitable mounting, the longitudinal axis of the body being parallel and collinear with the axis of its mounting.

It is another object to provide apparatus for lapping.

It is another object to provide apparatus for lapping wherein a viscous film is provided between relatively moving parts of lapping apparatus whereby quick relative movement of said parts perpendicular to said film is resisted. More particularly, it is an object to resist such quick movement although the parts are oscillated and/or reciprocated with respect to one another.

It is a further object of the present invention to provide apparatus for making a "perfect" screw adaptable for use in a ruling engine, such screw having uniform pitch and diameter and the axis of the screw being parallel and collinear with the axis of its mounting as well as having thrust bearings free of periodic error. An additional object is to provide a "perfect" screw for a ruling engine. Other objects will be apparent from the description of the invention as set forth hereinafter.

For purposes of illustration, the invention is described hereinafter in connection with the drawings which accompany the present application, wherein:

Fig. 1 is a longitudinal section through one form of apparatus according to the invention suitable for lapping the thrust bearings and the thread of a precision screw;

Fig. 2 is a sectional view taken on the line 2—2 of Fig. 1; and

Fig. 3 is a sectional view taken on the line 3—3 of Fig. 1.

One embodiment of the present invention for making a "perfect" screw is shown in Figs. 1 to 3, inclusive, wherein a screw 1 having for example a pitch of twenty turns to the inch is mounted by means of zero lead or zero pitch threaded journals 2 and 3 in bearings 4 and 5, which include zero lead or zero pitch female threads matching the male threads on the journals 2 and 3. The threads on journals 2 and 3 serve as thrust bearing surfaces for the screw 1 at the ends thereof. The journals 2 and 3 are supported semikinematically by the bearings 4 and 5 respectively.

As applied to the finishing of a screw, the invention provides apparatus for lapping both the threaded journals 2 and 3 and the helical thread on the central portion of screw 1. Lapping of the journals 2 and 3 is desirable because, no matter how carefully the journals and their male threads are machined, they may exhibit longitudinal periodic error, i. e. the threads may not be of truly zero pitch all the way around the screw. Lapping of the helical thread is necessary both to correct errors in the thread itself and to render the thread coaxial with the axis of rotation of the screw as determined by the shape of the journals 2 and 3. Fig. 1 shows the apparatus for lapping both the journals and the helical thread, although it is preferable to lap either the journals or the helical thread at one time, by employing at any one time only the elements of the apparatus shown in that figure which contribute to the lapping of the journals or alternatively the elements which contribute to lapping of the helical thread.

For the lapping of the journals 2 and 3, auxiliary rigid plates 6 and 7 are disposed at the respective ends of screw 1 and are in indirect contact with the screw 1 by means of ball-and-socket pins 8 and 9, respectively, said plate 6 being urged against pin 8 by means of a centering and contacting device such as spring 10 biased toward screw 1 and plate 7 being urged against pin 9 in like manner by spring 11, also biased against screw 1, to exert balanced forces on each end of the screw during rotation thereof in bearings 4 and 5.

For the lapping of the helical thread, the screw is surrounded by a nut or nut drum 12 consisting of two halves 13 and 14. The respective halves 13 and 14 of the nut drum 12 are threaded internally with a female thread matching the helical thread of the screw. The external surface of the nut drum 12 is substantially cylindrical, the lower half 13 thereof being disposed within a hemi-cylindrically shaped ruling engine base 16 and the upper half 14 of the nut drum 12 lying within the inner surface of hemi-cylindrically shaped auxiliary casting 17 having a suitable flange for engagement with the lateral edges of the ruling engine base 16 as clearly shown in Figs. 2 and 3. If desired the auxiliary casting 17 may be bolted to the ruling engine base 16 in the manner shown in the drawings. The base 16 and the casting 17 together form a cylindrical casing substantially coaxial with the axis of the bearings 4 and 5, within which casing the nut 12 fits with a small clearance when fitted about the helical thread of the screw. A pulley 18 is mounted on an extension of screw 1, as shown in Figure 1, and this pulley is engaged by a belt 19, the latter being driven from a suitable power source (not shown) whereby screw 1 may be rotated and oscillated as desired.

According to one feature of the present invention a thin layer or film of a viscous fluid such as oil is placed between various parts of the lapping apparatus such as the grinding or polishing lap comprising the two halves 13 and 14 of the nut 12. This viscous fluid layer or film, by virtue of its relative incompressibility, will resist quick relative motion of the parts of the lap in a direction perpendicular to the plane of the film; whereas slow relative motion of the parts in a direction perpendicular to the plane of the film will be allowed. At the same time, relatively free motion of the parts of the lap in directions parallel to the plane of the film will be allowed, by virtue of the negligible shear resistance of the film.

This feature of the invention facilitates fitting the lap to the work, such as fitting the nut halves 13 and 14 of Fig. 1 to the screw 1 since the adjustment of the viscous fluid layer or film is relatively slow. At the same time, this feature of the invention provides a strong restraint to quick relative motion between the lap parts perpendicularly to the plane of the viscous film between those parts so that, for such motion, the lap parts are caused to act together as if they comprised an integral rigid lap. For example, when the space O between the lap parts is filled with a thin layer of oil of the order of a few thousandths of an inch thickness as indicated on an exaggerated scale in Figs. 1 and 2, the relative motion of the nut lap halves which would be produced, for example, by rotation of an out-of-round screw, this relative motion being a relatively quick one, is strongly restrained.

The invention thus provides integrated component parts of a screw lap by means of a surrounding thin layer of a viscous liquid; more particularly, by means of liquid layers lying parallel to the axis of the screw. In this manner quick relative movement of the nut halves perpendicular to the screw axis, which would be produced by out-of-roundness of the screw, is strongly restrained whereas the slow relative shifting required to fit the nut halves to the screw is permitted, or but weakly restrained.

The function of the respective films shown in Figs. 1 and 2 are as follows: Films A and A', when plates 6 and 7 are used, restrain erratic or irregular longitudinal motion of the work with respect to the bearings 4 and 5 and the work support comprising the frame 15 and casing 16, 17 and thereby eliminate periodic error of the thrust bearings. Film B, when the nut 12 is used, restrains wobble of the screw such as might be caused by a lack of coincidence of the axis of its helical thread with its axis of rotation defined by its journals 2 and 3 as supported in the bearings 4 and 5. By means of this restraint these two axes are lapped into coincidence. Film O integrates the nut halves in such a manner as to constitute a virtually rigid integral lap so that it quickly makes the screw round and straight.

All of these fluid films have their thicknesses substantially perpendicular to the relative motions of the parts between which they lie which are caused by the irregularities to be removed by the lapping process. By virtue of the inertia and viscosity of the fluid, the fluid films in the spaces A, A', B and O resist such relative motions, and this resistance controls the lapping. Unavoidable shear in these films has little effect on the lapping.

According to the present invention as applied to the finishing of a screw, the screw is finished to a perfect figure with respect to both the shape of its helical thread, the shape of its journals, and the coaxial relation of the journals and helical thread by alternately lapping the journals and the helical thread. To control these lappings the space B between the nut and the casing made up of elements 16 and 17 and the spaces A and A' between plates 6 and 7 and the base 15 (which is rigid with the casing elements 16 and 17) are alternately employed by filling them with a viscous fluid such as oil. To correct the journals, a lapping compound is applied between the journals 2 and 3 and their bearings 4 and 5, and the plates 6 and 7 and ball and socket joints 8 and 9 are positioned as shown in Fig. 1, with oil films in the spaces A and A'. The nut 12 is preferably removed from the screw, and the screw is rotated, preferably in irregular fashion, by means of the belt 19. The frequency of oscillation of the screw, i. e. its speed of rotation, or the frequency at which the direction of rotation is reversed, should be sufficiently great so that the plates 6 and 7 remain sensibly stationary in view of their inertia. The amplitude of these rotational oscillations of the screw may be irregularly varied. The oscillations may comprise a series of rotational surges separated by relaxation times to allow thermal equilibrium to set in. The amplitude of these surges may be of the order of a few revolutions.

When the plates 6 and 7 and oils films at A and A' are employed to lap the journals, errors in the journal threads will induce small longitudinal motions of the screw, but these motions will be resisted by the oil films at A and A', which are perpendicular to the erratic motions of the screw sought to be eliminated by lapping of the journals. The viscosity and inertia of the oil in these transverse films at A and A' powerfully resist such longitudinal motions and result in a selective lapping of the journal threads as required to dress those parts of the threads which generate such longitudinal motions.

In order to correct the figure of the helical thread and to bring its axis into coincidence with the axis of the journals 2 and 3, the plates 6 and 7 and the links 8 and 9 are removed, the journals 2 and 3 and the bearings 4 and 5 are cleaned of lapping compound and oiled for purposes of lubrication only, and the nut 12 is fitted about the helical thread of the screw with a grinding or lapping compound between the male and female threads so engaged. An oil film is applied in the clearance B between the nut and the casing formed by elements 16 and 17, and an oil film is also applied at the space O between the nut halves in order to integrate them into a single lapping tool. Upon rotation of the screw by means of the belt 19, the eccentricities of the helical thread will seek to drive the nut in bodily rotational motion, seeking to change the thickness of the oil film in the space B at successively different positions around the outside of the nut. The rotation of the screw is again effected at such speeds that the nut executes only small rotational motions about its own axis and moves only slightly with respect to the casing except for the axial motion determined by the screw threads. The viscosity and incompressibility of the oil in the spaces B and O (these spaces being respectively perpendicular to the motions sought to be imposed on the nut as a whole with respect to the housing and on the halves of the nut with respect to each other), effect a selective lapping of the helical thread, lapping most those portions of the thread which are farthest from the axis of rotation of the screw. While the errors of pitch in the thread itself are corrected by integration of the various turns of the female thread on the nut through the structure of the nut itself, the selective lapping of radial errors in the thread effected by the oil film in the space B brings the thread into coaxial relation with the axis of rotation of the screw defined by its journals. The integration of the nut halves by means of the film at O corrects out-of-roundness of the helical thread.

From time to time as alternate lapping of the journals and of the screw thread proceeds, the bearings 4 and 5 and the nut halves 13 and 14 are respectively tightened. Also in the case of lapping of the journals 2 and 3, the plates 6 and 7 are slowly rotated so that any effects which might be produced in the screw mounting by the aforementioned shear will be circularly symmetrical. Similarly the nut drum is slowly rotated by hand in the course of the lapping of the screw thread so that effects which might be produced in the screw by the aforementioned shear will also be circularly symmetrical.

In accordance with the teachings of Rowland, from time to time as the screw thread is being lapped the nut is reversed end for end, or its halves are separately reversed. Also, after Rowland, from time to time a short nut can be employed to test the screw and used, by lapping, to keep its diameter uniform. The nut 12 may be immersed in oil and given about the same average density as the oil by means of cavitation in its structure. Thus deflections of the screw due to gravity may be avoided.

By repeated working, using finer and finer grits, and by alternating the work on the journals 2 and 3 with work on the screw thread and by finishing finally with polishing compounds, the desired end result will be achieved—a perfect screw perfectly mounted.

Such differential restraints as I have described accelerate lapping and the elimination of the errors in the screw.

There are many such applications of thin layers of a viscous liquid where, on the one hand, the permitted gradual adjustment facilitates the fitting of the lap to the work and, on the other hand, the restraint of quick relative shifts accelerates lapping where it is most needed.

It will be apparent to one skilled in the art that a given shift may be made to fall in the category of a slow shift by the use of a suitably fluid liquid layer with a suitable thickness. At the same time the thickness of the liquid layer and its viscosity are to be chosen so that the undesired shifts between lap components will fall in the category of quick shifts by the use of a suitably viscous layer with appropriate thinness.

By the term "viscous liquid film" is meant a film of liquid which resists sudden changes of thickness while slowly yielding to a force tending to produce sudden changes and at the same time yields readily to a force tending to produce planar slippage.

It will also be evident to one skilled in the art that my invention has other application than the one used here for illustration — that is the application to the lapping of a screw. I do not wish to restrict my invention to this example since it is applicable to finishing and lapping generally.

I claim:

1. Apparatus for accurately finishing rotationally symmetrical work having irregularities thereon; said apparatus comprising a support for said work; means for rotating said work with respect to said support; finishing means surrounding said work substantially concentrically and being adjacent said work support and reciprocable with respect to said work parallel to the rotationally symmetrical surface of said work; and a support for said finishing means including a viscous film upon which said finishing means is adapted to move relative to said finishing means support, said film being disposed with its thickness perpendicular to the axis of symmetry of said work, whereby sudden relative movement between said work and said finishing means is resisted in directions perpendicular to the axis of symmetry of said work.

2. Apparatus for lapping to remove the errors of a helical thread on a lead screw; said apparatus comprising a base, bearings fixed with respect to the base, a casing having a substantially cylindrical inner surface, said casing being fixed with respect to said base with said inner surface in substantially coaxial position with respect to the axis defined by the bearings, a nut adapted to fit the thread of a lead screw to be lapped, said nut having a substantially cylindrical outer surface fitting with small clearance within the casing, said nut being split into halves along a plane containing the axis of its thread, viscous fluid films filling the clearances between the outer surface of the nut and the inner surface of the casing and between the halves of the nut, and means to rotate a screw to be lapped supported in said bearings.

3. Apparatus for lapping to reduce errors of lead in the zero lead screw-threaded journals of a lead screw having journals fitted with nominally zero lead screw threads for cooperation with thrust surfaces in bearings for such a lead screw, said apparatus comprising a base, bearings fixed with respect to said base, said bearings having zero lead female screw threads adapted to match the zero lead threads of the journals of such a lead screw to be lapped, end walls transverse to the axis of said bearings fixed with respect to said base, plates abutting said walls, stress transmitting members adapted to be positioned between said plates and the ends of a lead screw mounted in said bearings, viscous fluid films filling the spaces between said plates and said walls, and means to rotate a lead screw supported in said bearings.

4. Apparatus for lapping to remove errors in the helical thread of a lead screw and to bring the thread into coaxial relation with the journals of the lead screw, said apparatus comprising a base, bearings adapted to fit the journals of a lead screw fixed with respect to said base, a casing fixed with respect to said base, said casing having a substantially cylindrical inner surface in substantially coaxial relation to the axis of the bearings, a nut adapted to engage said thread of a lead screw and to fit within said casing with small clearance, a viscous fluid film filling the clearance between said casing and nut, and means to rotate a lead screw supported in said bearings.

5. Apparatus for lapping to coaxial relationship three rotationally generated surfaces on a workpiece, said apparatus comprising a base, bearings supported in said base in position to engage two of said surfaces, a lapping tool of large inertia having a working surface conforming at least in part to said third surface, means supporting said lapping tool from said base with its working surface substantially coaxial with the axis of said bearings, said means including a pair of rigid members and a fluid film filling the space between said members, said film having its thickness parallel to the direction of relative motion imposed upon the members of said pair by motion of said tool radially of said axis, and means to rotate said workpiece in said bearings.

6. Apparatus for lapping to remove errors in the helical thread of a lead screw and to remove errors of thrust in thrust surfaces on the journals of said screw, said apparatus comprising a base, bearings fixed with respect to said base and including thrust-absorbing surfaces adapted to match the thrust surfaces on the journals of such a lead screw to be lapped, a casing having a substantially cylindrical inner surface, said casing being fixed with respect to said base with said inner surface substantially coaxial with the axis of said bearings, a nut adapted to fit the helical thread of such a lead screw to be lapped, said nut having a substantially cylindrical outer surface fitting within said casing with clearance small enough to be filled with a film of viscous fluid, end walls fixed with respect to said base transversely of said bearings, plates abutting said walls, stress-transmitting members adapted to be positioned between said plates and the ends of a screw to be lapped when mounted in said bearings with clearances between said walls and plates small enough to be filled with films of viscous fluid, and means to rotate a lead screw supported in said bearings.

JOHN D. STRONG.

REFERENCES CITED

The following references are of record in the file of this patent:

UNITED STATES PATENTS

| Number | Name | Date |
|---|---|---|
| 222,736 | Richards | Dec. 16, 1879 |
| 1,291,982 | Madsen | Jan. 21, 1919 |
| 1,295,962 | Brown | Mar. 4, 1919 |
| 1,660,811 | Perkins | Feb. 28, 1928 |
| 1,727,112 | Munday | Sept. 3, 1929 |
| 1,825,676 | Munday | Oct. 6, 1931 |
| 1,894,807 | Wiedmann | Jan. 17, 1933 |
| 1,897,049 | Hawes | Feb. 14, 1933 |
| 1,918,483 | Munday | July 18, 1933 |
| 2,215,107 | Mulka | Sept. 17, 1940 |
| 2,314,533 | Wallace | Mar. 23, 1943 |
| 2,478,510 | Stolpe | Aug. 9, 1949 |